No. 886,415. PATENTED MAY 5, 1908.
C. B. ROZIAR.
PLANTER.
APPLICATION FILED AUG. 5, 1907.
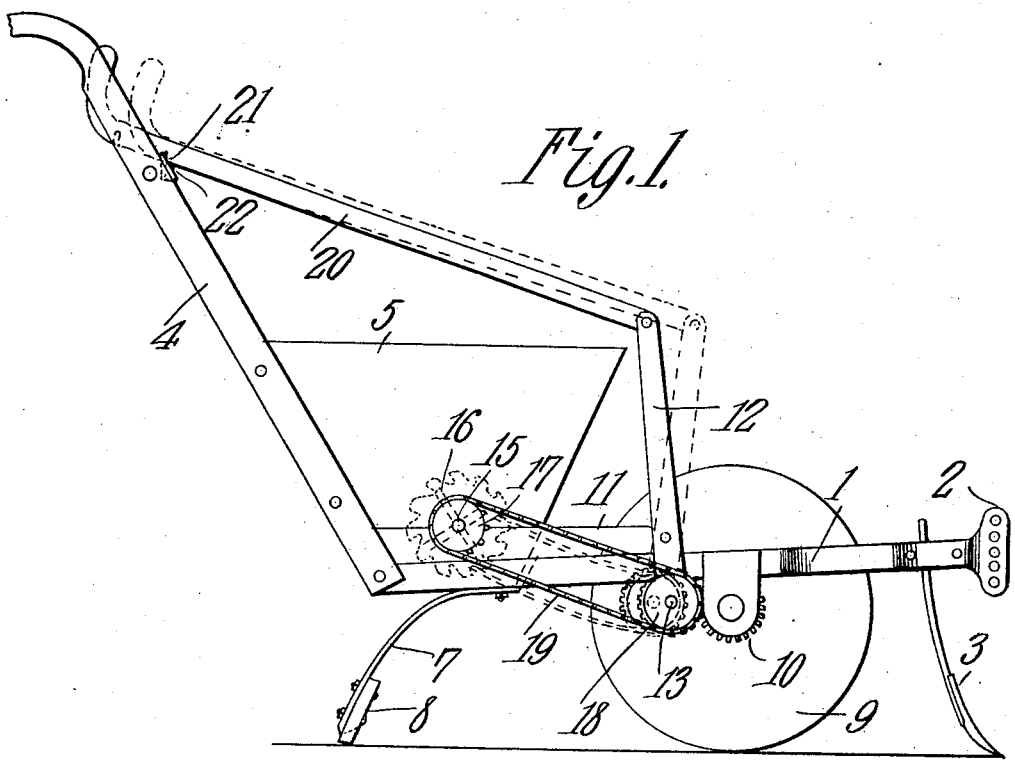
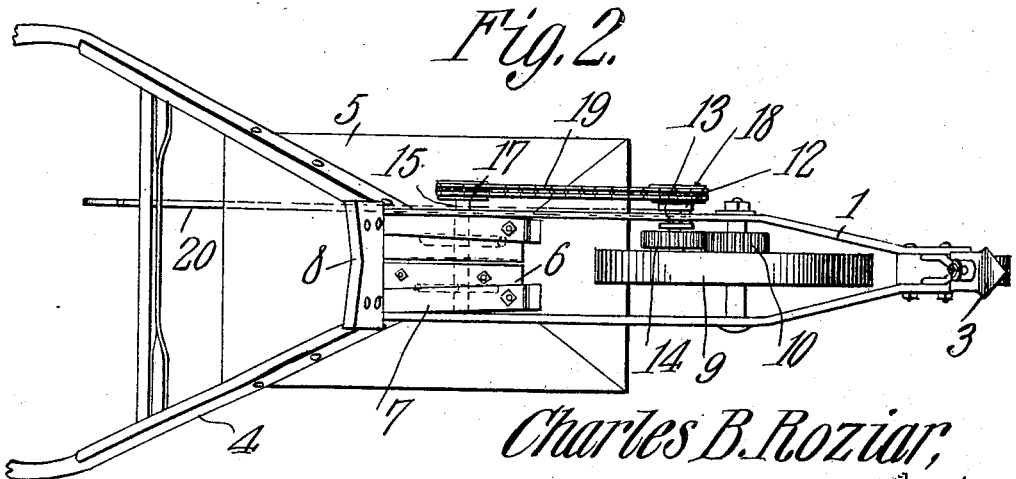
Charles B. Roziar,
Inventor.
Witnesses

UNITED STATES PATENT OFFICE.

CHARLES B. ROZIAR, OF EMPIRE, GEORGIA.

PLANTER.

No. 886,415.  Specification of Letters Patent.  Patented May 5, 1908.

Application filed August 5, 1907. Serial No. 387,121.

*To all whom it may concern:*

Be it known that I, CHARLES B. ROZIAR, a citizen of the United States, residing at Empire, in the county of Dodge and State of Georgia, have invented a new and useful Planter, of which the following is a specification.

This invention has relation to planters and it consists in the novel construction and arrangement of its parts as hereinafter shown and described.

The object of the invention is to provide a planter especially adapted for dropping cotton and other lint bearing seed, the parts of which are so arranged that the dropping mechanism may be easily and readily thrown out of gear or brought to a state of rest when the planter is making a turn or passing around stumps or similar obstructions. By this means a great saving of seed is effected.

In the accompanying drawing:—Figure 1 is a side elevation of the planter, and Fig. 2 is a bottom plan view of the same.

The planter consists of the frame 1, the forward end of which is provided with a clevis support 2 and an opening plow 3. The handles 4 are connected with the rear end of the frame 1 and the hopper 5 is mounted upon the rear end portion of the same. The adjustable plates 6 are located at the bottom of the hopper 5 and the space between the said plates forms the opening of the hopper. The arms 7 are attached at their upper ends to the hopper 5 and the cover board 8 is fixed to the lower ends of the arms 7. The ground wheel 9 is journaled for rotation in suitable bearings provided upon the frame 1 and the gear wheel 10 is arranged to rotate with the ground wheel 9. The arm 11 is attached to the hopper 5 and extends in a forward direction toward the ground wheel 9. The lever 12 is fulcrumed upon the arm 11 and the stub shaft 13 is journaled for rotation in the lower end of said lever. The gear wheel 14 is fixed to the stub shaft 13 and is adapted to mesh with the gear wheel 10. The shaft 15 is journaled in the hopper 5 and the seed sower 16 is mounted upon the shaft 15. The sprocket wheel 17 is fixed to the outer end of the shaft 15 and the sprocket wheel 18 is fixed to the stub shaft 13 and the sprocket chain 19 passes around the sprocket wheels 17 and 18. The rod 20 is pivotally connected to the upper end of the lever 12 and is provided at its rear end with notches 21 which are adapted to receive the edge of a cross piece 22 attached to the handles 4.

From the foregoing description it is obvious that when the rod 20 is moved longitudinally that the lever 12 is swung upon its fulcrum and the gear wheel 14 may be swung out of or into engagement with the gear wheel 10 and by passing the notches 21 over the edge of the cross piece 22 the parts will be held in their adjusted position. When the gear wheel 14 is in mesh with the gear wheel 10 the shaft 13 is rotated and through the sprocket wheel 18 and sprocket chain 19 the sprocket 17 and shaft 15 is rotated. Thus the seed sower 16 is rotated and separates the seed from the bulk and passes the same through the space between the plates 6. At the end of the row, or when an obstruction is encountered, the operator may move the rod 20, whereby, the lever 12 is swung and the gear wheel 14 is swung out of engagement with the gear wheel 10. Thus the seed sower 16 is brought to a state of rest and the dropping of the seed is interrupted. By mounting the arms 7 directly upon the hopper 5 the seed falls from the hopper through the space between the said arm and is covered almost immediately after it is deposited in the furrow by the cover board 8. Also the cover board 8 is under the body of the implement and the parts are compactly arranged, whereby, turns may be easily and readily accomplished.

Having thus described my invention what I claim as new and desire to secure by Letters-Patent is:—

A planter comprising a frame, a wheel supporting the same a gear wheel arranged to rotate with said supporting wheel, a hopper mounted upon the frame, a rotating seed separator located within the hopper, a sprocket wheel attached to the shaft of the seed separator, an arm attached to the hopper, a lever fulcrumed upon said arm, a shaft journaled in said lever, a gear wheel fixed to said shaft and adapted to engage and disengage the first said gear wheel, a sprocket wheel attached to the last said shaft, a sprocket chain passing around said sprocket wheel, a rod pivotally attached to said lever and having notches, handles attached to the frame and a cross piece mounted upon the handles and adapted to be engaged by the notches of said rod.

In testimony that I claim the foregoing as my own, I have hereto affixed my signature in the presence of two witnesses.

CHARLES B. ROZIAR.

Witnesses:
R. G. LYTLE,
A. E. ROZAR.